United States Patent
Iwata et al.

(10) Patent No.: US 9,506,173 B2
(45) Date of Patent: Nov. 29, 2016

(54) ELECTRO-CHARGEABLE FIBER, NONWOVEN FABRIC AND NONWOVEN PRODUCT THEREOF

(75) Inventors: Masuo Iwata, Moriyama (JP); Takayuki Nishitani, Moriyama (JP)

(73) Assignee: JNC FIBERS CORPORATION, Tokyo (JP)

( * ) Notice: Subject to any disclaimer, the term of this patent is extended or adjusted under 35 U.S.C. 154(b) by 1693 days.

(21) Appl. No.: 11/130,716

(22) Filed: May 17, 2005

(65) Prior Publication Data
US 2005/0268817 A1 Dec. 8, 2005

(30) Foreign Application Priority Data
May 17, 2004 (JP) ................................. 2004-146562

(51) Int. Cl.
| | | |
|---|---|---|
| D04H 1/54 | (2012.01) | |
| D04H 1/4391 | (2012.01) | |
| D04H 1/4374 | (2012.01) | |
| D04H 1/4291 | (2012.01) | |
| D04H 1/4382 | (2012.01) | |
| D06M 15/53 | (2006.01) | |
| B01D 39/16 | (2006.01) | |
| D06M 13/17 | (2006.01) | |
| D06M 13/224 | (2006.01) | |

(52) U.S. Cl.
CPC ............ *D04H 1/54* (2013.01); *B01D 39/1623* (2013.01); *D04H 1/4291* (2013.01); *D04H 1/4374* (2013.01); *D04H 1/4382* (2013.01); *D04H 1/4391* (2013.01); *D06M 13/17* (2013.01); *D06M 13/224* (2013.01); *D06M 15/53* (2013.01); *B01D 2239/0216* (2013.01); *B01D 2239/0414* (2013.01); *B01D 2239/0435* (2013.01); *B01D 2239/065* (2013.01); *B01D 2239/0618* (2013.01); *B01D 2239/0636* (2013.01); *Y10T 428/2913* (2015.01); *Y10T 428/2915* (2015.01); *Y10T 428/2929* (2015.01); *Y10T 442/2008* (2015.04); *Y10T 442/2418* (2015.04); *Y10T 442/2475* (2015.04); *Y10T 442/2861* (2015.04)

(58) Field of Classification Search
CPC .................. Y10T 442/2475; Y10T 428/2933; Y10T 428/2938; D04H 1/54; D04H 1/4391; D04H 1/4291; D04H 1/4374; D04H 1/4382; D04H 1/485; D06M 13/17; D06M 13/224; D06M 15/53; B01D 39/1623; B01D 2239/0435; B01D 2239/0414; B01D 2239/0216; B01D 2239/065; B01D 2239/0618; B01D 2239/0636
USPC .................. 442/103, 110, 170; 428/375, 394
See application file for complete search history.

(56) References Cited

U.S. PATENT DOCUMENTS

| | | | | |
|---|---|---|---|---|
| 4,784,665 | A * | 11/1988 | Ona et al. ........................ | 8/115.6 |
| 4,798,850 | A * | 1/1989 | Brown ........................... | 521/134 |
| 6,454,986 | B1 * | 9/2002 | Eitzman et al. ............... | 264/442 |
| 6,506,959 | B2 * | 1/2003 | Hamajima et al. ........... | 604/367 |

(Continued)

FOREIGN PATENT DOCUMENTS

| | | |
|---|---|---|
| JP | 4-316673 | 11/1992 |
| JP | 2002-339256 | 11/2002 |

OTHER PUBLICATIONS

Textile Glossary Definitions, Celanese Acetate copyright 2001.*
(Continued)

*Primary Examiner* — Jennifer A Steele
(74) *Attorney, Agent, or Firm* — Hamre, Schumann, Mueller & Larson, P.C.

(57) ABSTRACT

An electro-chargeable fiber includes a thermoplastic resin fiber having a nonionic fiber finish containing at least one major component selected from the group consisting of (a) at least one sorbitan fatty acid ester having formula (I) or formula (II) and (b) polyoxyalkylene alkyl ether having formula (III), wherein the nonionic fiber finish is present in an amount of 0.01-1.5% by weight of the thermoplastic resin fiber;

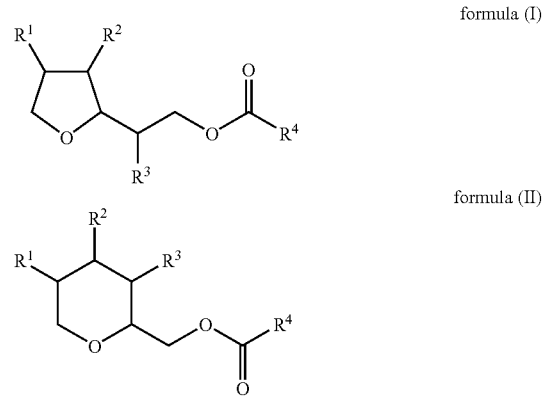

wherein $R^1$, $R^2$, and $R^3$ independently of one another represent a hydroxyl group, a polyoxyethylene group, or a polyoxypropylene group, the respective degree of polymerization (an ethylene oxide group or a propylene oxide group as a constitutional unit) independently of one another is from 0 to 55, and $R^4$ represents a saturated or unsaturated aliphatic hydrocarbon group of 16-30 carbon atoms, $$R^5\text{—O}\text{—}(\text{CH}_2\text{CHR}^6\text{O})_k\text{H} \qquad \text{formula (III)}$$

wherein $R^5$ represents a saturated or unsaturated aliphatic hydrocarbon group of 12-30 carbon atoms, $R^6$ represents hydrogen or a methyl group, and k is an integer from 5 to 50.

19 Claims, No Drawings

(56) References Cited

U.S. PATENT DOCUMENTS

| | | | |
|---|---|---|---|
| 2001/0039406 A1* | 11/2001 | Hamajima et al. | 604/367 |
| 2002/0022812 A1* | 2/2002 | Kasai et al. | 604/364 |
| 2002/0119312 A1* | 8/2002 | Iwata et al. | 428/369 |
| 2005/0148266 A1* | 7/2005 | Myers et al. | 442/401 |

OTHER PUBLICATIONS

Nonwoven definition, Textile Glossary, copyright 2001, Celanese Acetate.*

* cited by examiner

ELECTRO-CHARGEABLE FIBER, NONWOVEN FABRIC AND NONWOVEN PRODUCT THEREOF

BACKGROUND OF THE INVENTION

1. Field of the Invention

This invention relates to an electro-chargeable fiber and more particularly relates to an electro-chargeable fiber that does not require a washing process to remove fiber finish, used for nonwoven processed products such as air filters and wipers.

2. Description of the Related Art

In recent years, concerns about spaces free of garbage, dust, and dirt have been enhanced, including buildings, underground areas, vehicles, amusement arcades, as well as clean rooms in laboratories and factories. To provide such spaces, there has been a growing demand for air filters collecting dust by using electrostatic properties of fibers. Synthetic fibers with electrostatic charge or nonwoven fabrics thereof are being used for these air filters.

The above nonwoven products are obtained generally using staple fibers or short-cut fibers as a starting material and forming a web therefrom by a processing method such as a carding method or an air-laid method, followed by a heat adhesion or a mechanical entanglement thereof, and an electret treatment of the resulting nonwoven fabric. The electret treatment means that a process of heat-electret, corona discharge-electret and the like gives nonwoven fabrics an electrostatic charge in the forming process or after being formed.

The surfaces of fibers for a nonwoven fabric processing generally are supplied with a fiber finish (also referred to as finishing oil), such as a surfactant, in order to suppress adverse effects on processability and productivity of nonwoven fabric due to generation of electrostatic. However, for the above nonwoven products, such fiber finish disturbs the process of electret treatment, and lowers the dust-collecting efficiency over time as well.

Therefore, in the process of electret treatment of nonwoven fabric, there needs to be a secondary process for water or hot water washing, or a method of removing the fiber finish while entangling by a water-jet method, which presents problems such as restrictions in the process, increase in process facilities, and rising cost of production. A method of nonwoven fabric forming and electret treatment, by taking advantage of decreasing in fiber finish applied to fibers in a heat treatment process, is disclosed in patent reference 1. However, there are restrictions due to requirements of a heat treatment before the electret treatment and an advanced quality control technique to control the amount of fiber finish applied at below a given value.

Patent reference 1: Japanese patent application laid-open No. 2002-339256

SUMMARY OF THE INVENTION

The present invention relates to an electro-chargeable fiber made of thermoplastic resin (hereinafter referred to as a thermoplastic resin fiber) applied with finishing oil within a range which does not adversely influence on processability due to generation of electrostatic in a dry processing of nonwoven fabric such as a carding process and an air-laid process. An object of the present invention is to provide an electro-chargeable fiber capable of being easily electret-treated without any process restrictions such as variations in the amount of finishing oil applied to nonwoven fabric in the forming or after being formed, and introduction of a washing process.

The present invention provides a nonionic fiber finish, a fiber capable of an easy electret treatment and nonwoven products thereof. For purposes of the present invention, when a feature is defined as being selected from a group consisting of several elements, this is intended to mean that any one or more of the elements can be present. If the elements are generic, any one or more species of any one or more of the generic elements can be present.

(1) An electro-chargeable fiber comprises a thermoplastic resin fiber having a nonionic fiber finish containing at least one major component selected from the group consisting of (a) at least one sorbitan fatty acid ester having formula (I) or formula (II) and (b) polyoxyalkylene alkyl ether having formula (III), wherein the nonionic fiber finish is present in an amount of 0.01-1.5% by weight of the thermoplastic resin fiber;

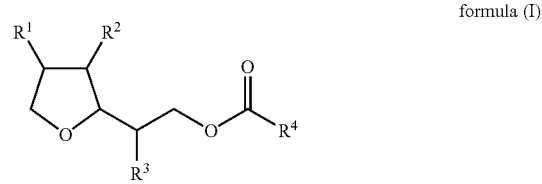

formula (I)

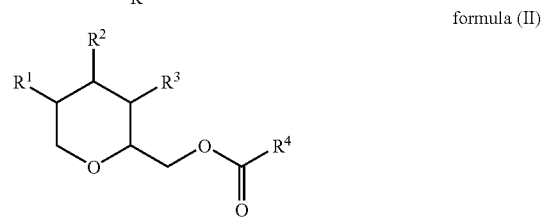

formula (II)

wherein $R^1$, $R^2$, and $R^3$ independently of one another represent a hydroxyl group, a polyoxyethylene group, or a polyoxypropylene group, the respective degree of polymerization (an ethylene oxide group or a propylene oxide group as a constitutional unit) independently of one another is from 0 to 55, and $R^4$ represents a saturated or unsaturated aliphatic hydrocarbon group of 16-30 carbon atoms,

formula (III)

wherein $R^5$ represents a saturated or unsaturated aliphatic hydrocarbon group of 12-30 carbon atoms, $R^6$ represents hydrogen or a methyl group, and k is an integer from 5 to 50.

(2) In the electro-chargeable fiber of the above described (1), the thermoplastic resin fiber may be a conjugate fiber comprising at least two types of thermoplastic resins having a different melting point from each other, wherein at least one type of the thermoplastic resins is a polyolefin, and the polyolefin is exposed on at least one part of the conjugate fiber surface continuously in a length direction.

(3) In the electro-chargeable fiber of the above described (1) or (2), the thermoplastic resin fiber may be composed of thermoplastic resins, wherein at least one sort of the thermoplastic resins comprises a polymer of vinyl monomer having a functional group (hereinafter referred to as a modifying agent).

(4) The electro-chargeable fiber may have a fiber length of 3 to 40 mm.

(5) The electro-chargeable fiber may have a fiber length of 32 to 120 mm.

(6) A nonwoven fabric may be made by an air-laid method with the electro-chargeable fiber of the above described (4).

(7) A nonwoven fabric may be made by a carding method with the electro-chargeable fiber of the above described (5).

(8) A composite nonwoven fabric may be made by mixing the electro-chargeable fiber of any one of the above described (1) to (5) with at least one type selected from the group consisting of another fiber, another nonwoven fabric, a film, a pulp-sheet, a knit, and a textile fabric.

(9) A composite nonwoven fabric may be made by multi-layering the nonwoven fabric of the above described (6) or (7) with at least one type selected from the group consisting of another fiber, another nonwoven fabric, a film, a pulp-sheet, a knit, and a textile fabric.

(10) Nonwoven products may be made with the nonwoven fabric of the above described (6) or (7), or the composite nonwoven fabric of the above described (8) or (9).

(11) An air filter may be obtained by an electret treatment of the nonwoven fabric of the above described (6) or (7), or the composite nonwoven fabric of the above described (8) or (9).

(12) A wipe may be obtained by an electret treatment of the nonwoven fabric of the above described (6) or (7), or the composite nonwoven fabric of the above described (8) or (9).

(13) A mask may be obtained by an electret treatment of the nonwoven fabric of the above described (6) or (7), or the composite nonwoven fabric of the above described (8) or (9).

DETAILED DESCRIPTION

The electro-chargeable fiber of the present invention is electrical-charged moderately by having a nonionic fiber finish comprising sorbitan fatty acid esters or polyoxyalkylene alkyl ether. Therefore, generation of electrostatic is suppressed in a nonwoven fabric processing by an air-laid machine and a carding machine, but a suitable electrostatic charge can be maintained for properties of nonwoven products, without a removing process such as washing of fiber finish in a heat-electret treatment of nonwoven fabric. Moreover, since it is not necessary to control the applied amount of oil during a heat history, webs obtained with the fiber can be processed in a variety of nonwoven fabric processing conditions such as needlepunching and the like.

The present invention will be described in more detail.

Fiber finish used in the present invention of the electro-chargeable fiber can be sorbitan fatty acid ester or polyoxyalkylene alkyl ether itself, but if necessary, it is possible to formulate additives such as antioxidant, antiseptic agent, antirust, antibacterial agent, wetting agent (hydrophilic agent), etc., within a range not damaging the effects of the present invention Sorbitan fatty acid ester is a compound having formula (I) or formula (II):

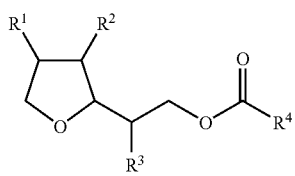

formula (I)

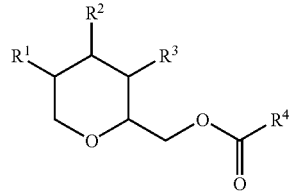

formula (II)

wherein $R^1$, $R^2$, and $R^3$ independently of one another represent a hydroxyl group, a polyoxyethylene group, or a polyoxypropylene group, the respective degree of polymerization (an ethylene oxide group or a propylene oxide group as a constitutional unit) independently of one another is from 0 to 55, and $R^4$ represents a saturated or unsaturated aliphatic hydrocarbon group of 16-30 carbon atoms, The sorbitan fatty acid ester is considered a nonionic surfactant having a high wettability and viscosity.

Examples of the sorbitan fatty acid esters used in the present invention of the electro-chargeable fiber include sorbitan monolaurate, sorbitan monopalmilate, sorbitan monostearate, sorbitan monooleate, sorbitan sesquioleate, sorbitan sesquistearate, sorbitan trioleate, sorbitan tristearate, sorbitan monoisostearate, coconut oil fatty acid sorbitan, and the like. Examples of polyoxyethylene derivatives of the sorbitan fatty acid esters include polyoxyethylene (EO=4) sorbitan monolaurate, polyoxyethylene (EO=4) sorbitan tristearate, polyoxyethylene (EO=4) sorbitan trioleate, polyoxyethylene (EO=5) sorbitan monooleate, polyoxyethylene (EO=6) sorbitan monooleate, polyoxyethylene (EO=6) sorbitan monostearate, polyoxyethylene (EO=20) monococonut oil fatty acid sorbitan, polyoxyethylene (EO=20) monopalmilate, polyoxyethylene (EO=5) sorbitan monolaurate, polyoxyethylene (EO=20) sorbitan monolaurate, polyoxyethylene/polyoxypropylene sorbitan monolaurate, polyoxyethylene (EO=20) sorbitan monostearate, polyoxyethylene (EO=20) sorbitan monoisostearate, polyoxyethylene (EO=20) sorbitan monooleate, polyoxyethylene (EO=20) sorbitan trioleate, and polyoxyethylene (EO=20) sorbitan tristearate, and the like. Sorbitan fatty acid ester in the present invention is not to be limited to the above examples.

In the case that sorbitan fatty acid ester/s is/are a major component of fiber finish, it is present in 50% or more by weight of the fiber finish, preferably in a range of 60 to 70% by weight. Other components formulated therein are preferably nonionic surfactants which may have effects on emulsifying and preserving fiber finish, and as such surfactant, the polyoxyalkylene alkyl ether (above mentioned) can be included.

Polyoxyalkylene alkyl ether is a compound having formula (III):

$$R^5-O+CH_2CHR^6O+_kH \qquad \text{formula (III)}$$

wherein $R^5$ represents a saturated or unsaturated aliphatic hydrocarbon group of 12-30 carbon atoms, $R^6$ represents hydrogen or a methyl group, and k is an integer from 5 to 50.

Carbon atoms of $R^5$ having 12 or more are preferable to keep a good openness of fibers while suppressing frictions between fibers, and synthesis of polyalkylene alkyl ether having 30 or less carbon atoms is not difficult and suitable for the industrial production. Carbon atoms of $R^5$ from 18 to 30 are more preferable. The values of k from 10 to 25 in the formula are more preferable.

Examples of the polyoxyalkylene alkyl ether used in the present invention of the electro-chargeable fiber include polyoxyethylene (k=20) behenyl ether, polyoxyethylene (k=14) stearyl ether, polyoxyethylene (k=20) tetracosanyl ether, polyoxyethylene (k=18) octacosanyl ether, polyoxyethylene (k=10) triacontanyl ether, polyoxyethylene (k=5) lauryl ether, polyoxyethylene/polyoxypropylene (2 constitutional units of ethylene oxide, 3 constitutional units of propylene oxide, and k=8 in total) lauryl ether, and the like. Polyoxyalkylene alkyl ether used in the present invention is not to be limited to the above examples.

In the case that polyoxyalkylene alkyl ether is a major component of fiber finish, it is present in 50% or more by weight of the fiber finish, preferably in a range of 60 to 70% by weight. Other components formulated therein are preferably nonionic surfactants that may have effects on emulsifying and preserving fiber finish, and as such surfactant, the sorbitan fatty acid ester (above mentioned) can be included.

Fiber finish used in the present invention of the electro-chargeable fiber contains at least one major component selected from sorbitan fatty acid ester and polyoxyalkylene alkyl ether, and other nonionic components may be optionally contained. In other wards, the fiber finish used in the present invention is preferable with no ionic components. However, a trace of ionic components may be contained for some purpose within a range which does not adversely influence on the effects of the present invention. The fiber finish is used in a state dissolved in water if necessary.

In the electro-chargeable fiber of the present invention, the fiber finish having a major component comprising sorbitan fatty acid ester or polyoxyalkylene alkyl ether is applied in an amount of 0.01 to 1.5% by weight of fiber, preferably of 0.15 to 1.0% by weight. The applied amount of 0.15% or more by weight can suppress generation of electrostatic moderately so that processability and formation of nonwoven fabric become excellent. The amount of 1.5% or less by weight prevents electrostatic charge of nonwoven fabric from being disturbed by fiber finish in an electret treatment to provide lead improved electret characteristics to a nonwoven fabric.

The electro-chargeable fiber in the present invention may comprise a fiber made of melt-spinable thermoplastic resins as a starting material, in particular, a single fiber melt-spun from one thermoplastic resin or from two or more types of thermoplastic resins being mixed uniformly, and a conjugate fiber spun by a conjugate spinning method from two or more types of thermoplastic resins.

As the thermoplastic resins, for example, there are polyolefins such as polypropylene, high-density polyethylene, low-density polyethylene, linear low-density polyethylene, bipolymer and terpolymer of propylene and other α-olefins; polyamides; polyesters such as polyethylene terephthalate, and polybutylene terephthalate, low melting point polyester copolymerized diol with terephtalic acid/isophthalic acid, polyester elastomer; fluoropolymers, and mixtures thereof.

In the case of the electro-chargeable fiber being composed of a conjugate fiber, various conjugate types are used including sheath-and-core, side-by-side, multi-layered with more than 2 layers, hollow multi-layered, modified cross-section multi-layered, and the like. In a combination of thermoplastic resins, a melting point difference is preferably more than 10° C., and of the thermoplastic resins composing a fiber, a lower melting point thermoplastic resin is exposed on at least one part of the fiber surface, preferably continuously in the fiber length direction. As a result, when the conjugate fiber is heat-treated at a temperature higher than a softening or melting point of a low melting point thermoplastic resin, but below a melting point of a high melting point thermoplastic resin, the low melting point thermoplastic resin is melted to form a heat adhesive nonwoven fabric having a three dimensional network structure through intersections of the fibers being heat-adhered one another.

In the case of the electro-chargeable fiber being composed of a conjugate fiber comprising two sorts of thermoplastic resins with a low melting point and a high melting point, examples of the combination include high-density polyethylene/polypropylene, low-density polyethylene/polypropylene, linear low-density polyethylene/polypropylene, low-density polyethylene/propylene-ethylene-butene-1 crystalline copolymer, ethylene-propylene copolymer/polypropylene, high-density polyethylene/polyethylene terephthalate, nylon-6/nylon-66, low melting temperature polyester/polyethylene terephthalate, polypropylene/polyethylene terephthalate, polyvinylidenefluoride/polyethylene terephtalate, a mixture of linear low-density polyethylene and high-density polyethylene/polyethylene, and the like. A conjugate fiber comprising polyolefins is preferable, and the combinations of low melting point thermoplastic resin/high melting point thermoplastic resin, for example, are high-density polyethylene/polypropylene, ethylene-propylene copolymer/polypropylene, and the like.

Weight ratio of a low melting point thermoplastic resin to a high melting point thermoplastic resin composing a conjugate fiber used in the present invention of the electro-chargeable fiber may be such that a low melting point thermoplastic resin is 10 to 90% by weight and a high melting point thermoplastic resin is 90 to 10% by weight, preferably a low melting point thermoplastic resin is 30 to 70% by weight and a high melting point thermoplastic resin is 70 to 30% by weight. When the content of low melting point thermoplastic resin is less than 10% by weight, heat adhesiveness becomes insufficient, and the strength of nonwoven fabric after processing is lowered. On the other hand, when the content of low melting point thermoplastic resin exceeds 90% by weight, the core component of high melting point thermoplastics is unable to maintain a fiber shape.

In a conjugate fiber used in the present invention for the electro-chargeable fiber, a low melting point component exposed on at least one part of the conjugate fiber surface continuously in a length direction can contain a polymer of vinyl monomer having a functional group (a modifying agent). The modifying agent is a resin containing a functional group, and as the functional group, there are a hydroxyl group, amino, nitrile, nitrilo, amide, carbonyl, carboxyl, glycidyl groups and the like. Modified polyolefins can be obtained by polymerization of vinyl monomer having the functional group, and copolymers such as block, random, ladder and graft polymer can be used. Examples of the vinyl monomer having a functional group include unsaturated carboxylic acids selected from anhydrous maleic acid, maleic acid, acrylic acid, methacrylic acid, fumaric acid, itaconic acid, and the derivatives; or vinyl monomer having at least one sort of the anhydrate; a group of styrenes such as styrene and α-methylstyrene; methacrylic acid esters such as methyl methacrylate, ethyl methacrylate, 2-hydroxyethyl methacrylate, dimethylaminoethyl methacrylate; vinyl monomer having at least one of the corresponding acrylic acid ester, glycidyl acrylate, glycidyl methacrylate, butanoic acid esters, allyl glycidyl ether, 3,4-epoxybutene, 5,6-epoxy-1-hexene, vinylcyclohexene monoxide, and the like.

The modifying agent may include in its structure 0.05 to 2.0 mol of vinyl monomer units having the above functional group(s) per 1 kg of the total weight of the modifying agent, preferably 0.05 to 1.0 mol per 1 kg. The modifying agent can be used preferably in an amount of 80% or less by weight of the sheath component of the fiber, taking into account cost and processability characteristics of the fiber. The amount is preferably 50% or less, more preferably 20% or less.

The modifying agent has a high adhesiveness to cellulosic fibers and inorganic materials composing a nonwoven fabric, and enhances electrostatic properties of the electro-chargeable fiber in the present invention by reacting with fiber finish. Therefore, as a modifying agent in the present invention, modified polyolefins, being composed of vinyl monomer comprising unsaturated carboxylic acid or the derivatives and polyolefin, can be preferably used.

Of the above modified polyolefins, a modified polyolefin of graft polymer has a high polymer strength and excellent fiber processability so that it can be used preferably. The modification rate is preferably as high as possible within a range that does not disturb the processability of fiber and the effects of the present invention.

As a backbone polymer of modified polyolefins, there may be used polyethylene, polypropylene, polybutene-1, and the like. Polyethylene includes high-density polyethylene, linear low-density polyethylene, and low-density polyethylene, which has a density of 0.90 to 0.97 g/cm$^3$ and a melting point of about 100 to 135° C. Polypropylene includes polypropylene homopolymer, and copolymer of propylene as a major component and other α-olefins. The polymer has a melting point of about 130 to 170° C. Polybutene-1 is a polymer having a melting point of about 110 to 130° C. Among these polymers, from considerations of melting point, and ease of copolymerization and graft polymerization, polyethylene is preferable and high-density polyethylene with a high polymer strength is more preferable to improve the strength of nonwoven fabric.

A low melting point component containing the above modified polyolefins may comprise a modified polyolefin itself, a mixture of at least two sorts of modified polyolefins, a mixture of at least one sort of modified polyolefin and unmodified polyolefins, or the like. Modified polyolefins, as compared with unmodified polyolefins, generally tend to be lower in polymer strength, and in order to keep fiber strength high, as a low melting point component, it is preferable to use a mixture of the modified polyolefin having a high modification rate and unmodified polyolefins, of which it is particularly preferable to use the same polymer as a backbone polymer of the modified polyolefin from a compatibility point of view.

When a modifying agent and other thermoplastic resin are mixed, it is preferable to use a modifying agent with a modification rate higher than about 0.1 mol/Kg. Using a modifying agent improves the adhesiveness between the electro-chargeable fiber of the present invention and other cellulosic fibers and inorganic materials, and also improves electrostatic properties of the electro-chargeable fiber. It is assumed that the fiber finish and a functional group of the modifying agent existing on fiber surface react to improve the electrostatic properties of fiber. It is preferable to mix the same thermoplastic resin as a backbone polymer comprising a modifying agent.

Thermoplastic resins composing a fiber for an electret treatment of the present invention can contain antioxidant, photo-stabilizer, absorbent of ultraviolet ray, neutralizer, nucleating agent, epoxy stabilizer, lubricant, antibacterial agent, flame retardant, pigment, plasticizer, and other thermoplastic resins within a range that does not disturb the effects of the present invention.

Fineness of the electro-chargeable fiber is not particularly limited, but a fiber with a fineness of 0.2 to 100 deniers preferably is used. In the case that a nonwoven fabric comprising a fiber for an electret treatment of the present invention is used for a filter member, a fiber with a fineness of 0.5 to 30 deniers is preferably used, although it depends on the substance being collected and permeability required The electro-chargeable fiber of the present invention is generally formed into a web itself, or mixed together with other fibers (e.g. nylon etc.), by a conventional method such as a carding method and an air-laid method, and the resulting web is processed into a nonwoven fabric by an air-through heat-treatment machine to heat-adhere intersections of fibers or by mechanical entanglement such as a water-jet method. Also the electro-chargeable fiber of the present invention can be laid on another nonwoven fabric, a film, a pulp sheet, a knit or a textile fabric, to give a composite nonwoven fabric.

The nonwoven fabric or the above mentioned composite nonwoven fabric can be multi-layered with other sheet such as nonwoven fabrics (which are obtained by a carding method, an air-laid method, a wet type paper-making method, a meltblowning method, and the like), films, pulp-sheets, knits, textile fabrics, wood plates, metal plates, etc., to give a multi-layered composite nonwoven fabric.

When an electro-chargeable fiber is processed by an air-laid method into a nonwoven fabric, it is necessary for fibers to be laid down through a sieve or screen so as to give a uniformly dispersed web. Therefore, a fiber with a fiber length of 3 to 40 mm preferably is used. When the fiber length largely exceeds 40 mm, a uniform dispersion tends to be difficult to achieve, and irregularity in formation tends to occur. On the other hand, when the fiber length is less than 3 mm, strength of the nonwoven fabric is not only lowered but also bulkiness of the nonwoven fabric featuring an air-laid method tends to be lost.

As a web forming machine for an air-laid method, for example, a box-shape sieve type machine can be used in either vibrating back and forth, right and left, up and down, or horizontal and circular to disperse and lay down staples through an opening of a screen. There can be also used a net cylindrical type machine with a perforated net metal plate shaped in a cylinder having an input structure at the side part, which separates and lays down staples from the opening of the net.

When the electro-chargeable fiber is processed into a web by a carding machine, a fiber with a fiber length of 32 to 120 mm is preferably used. When the fiber with a fiber length of largely beyond 120 mm is carded into a web, the fiber tends to be wound around a roller of the carding machine, and with a fiber length of less than 32 mm, the web formation becomes insufficient.

The number of crimps of the electro-chargeable fiber in the present invention is not particularly limited, but for web forming by a carding machine, the number of crimps in a range of 3 to 20/25 mm is preferable for a good web formation. When the number of crimps is less than 3/25 mm, the strength of the formed nonwoven fabric is lowered, and when it largely exceeds 20/25 mm, interlacing between fibers becomes so abundant that openness of fibers is lowered, and a uniform formation of the web and nonwoven fabric thereof as well become difficult to obtain. Any crimp shapes can be used including a two dimensional zigzag crimp, a three dimensional crimp such as spiral or omega-shaped crimp, and the like.

Number of crimps of the electro-chargeable fiber is not particularly limited, but for web forming by an air-laid method, number of crimps in a range of 0 to 15/25 mm is preferable for a good web formation. When the number of crimps largely exceeds 15/25 mm, interlacing between fibers becomes so abundant that openness of fibers is lowered, and a uniform formation of the web and nonwoven fabric thereof as well become difficult to obtain. Any crimp shapes can be used including a two dimensional zigzag crimp, a three dimensional crimp such as spiral or ohm-shaped crimp, and the like.

A web obtained by use of the electro-chargeable fiber and an air-laid method or a carding method is processed into a nonwoven fabric by a heat treatment of fiber intersections or mechanical interlacing of web. The heat treatment is carried out at a higher temperature than the softening or melting point of a low melting point thermoplastic resin, but at below the melting point of a high melting point thermoplastic resin by a machine capable of heat-adhesion of fiber intersections. An air-through heat-treatment machine, an embossing roller type heat-treatment machine, a flat roller type heat-treatment machine, and the like can be used. Particularly for a web formed by an air-laid method, an air-through heat-treatment machine preferably is used to form a bulky nonwoven fabric. The mechanical interlacing is a method of interlacing web by a high pressure water or needle, and preferably provides nonwoven fabrics with a soft touch. Nonwoven fabric can be made by needling, since the electro-chargeable fiber of the present invention does not need a decrease in components of fiber finish, which has been needed conventionally and requires steps of washing or thermal treatment.

A process of producing a heat adhesive conjugate fiber to prepare the electro-chargeable fiber of the present invention is described as follows.

Thermoplastic resins are spun by a conventional melt spinning machine with a side-by-side spinneret to form at least a part of fiber surface of a low melting point thermoplastic resin, or a sheath-and-core spinneret forming a low melting point thermoplastic resin as a sheath, and a high melting point thermoplastic resin as a core, or an eccentrically positioned sheath-and-core spinneret. A heat-adhesive unstretched fiber is produced by cooling an extruded half-melted fiber being blown with quenching air just under a spinneret. An unstretched fiber is obtained optionally by setting an extruding speed and take-up speed for a fiber diameter of about 1 to 5 times the target fineness of fiber. When a low melting point thermoplastic resin forming fiber surface occupies 50% or more of the length of periphery in a cross section of fiber, heat adhesivity is sufficient, when 50 to 100%, heat adhesivity is particularly strong and preferable, but which is not necessarily required to improve electret characteristics at the same time. The resulting unstretched fiber is stretched by a conventional stretching machine to give a stretched fiber (heat adhesive conjugate fiber prior to crimp processing). Stretching generally is carried out between rollers heated at 40 to 120° C., having the speed ratio of two rollers in a range of 1:1 to 1:5. The resulting stretched fiber may be subjected to crimping by a box type crimper. As a process for applying fiber finish, there are a method using kiss rollers when an unstretched fiber is taken up, a method using touch rollers at stretching or after being stretched, an immersing method, a spraying method, and the like. Fiber finish is applied by at least one of these methods. The fiber bundle is dried by a drying machine at 60 to 120° C., and cut by a press-cutter to an optional fiber length to use.

A nonwoven fabric by use of the electro-chargeable fiber is electrically charged by a heat-electret method under an atmosphere at a temperature below the melting point of a low melting point thermoplastic resin, by a corona discharge method, etc. to give characteristics of collecting and other functionalities to the nonwoven fabric. A method of an electret treatment is not particularly limited to the above mentioned methods.

A nonwoven fabric using the electro-chargeable fiber is obtained by the previously described methods, for example, an air-laid method and a carding method. The basis weight of the nonwoven is not particularly limited, but a base weight of 10 to 500 g/m² for a wipe, and a base weight of 8 to 1000 g/m² for a filter are preferable.

The nonwoven product by use of the electro-chargeable fiber can take various forms depending on its application, such as a fiber aggregate, a web, a nonwoven fabric, a fiber tow, a paper like material, a knit or a textile fabric. Among such forms, what is especially preferable is a product using the above mentioned nonwoven fabric or the composite nonwoven fabric, and such products are applicable for various uses. For example, the nonwoven fabric is electret-treated, which can be used as a wipe for cleaning furniture, floor, etc., and as a filter for air conditioners, masks, etc. As for the composite nonwoven fabric, for example, a nonwoven fabric reinforced in mechanical strength and stiffness by layering with a net can be pleated to obtain a filter keeping its strength as well.

EXAMPLES

The present invention will be described by way of Examples and Comparative examples, but it should not be construed to be limited thereto. In addition, methods and definitions by which various values of physical properties in Examples and Comparative examples were measured are collectively shown as follows:

Number of crimps: measured according to JIS L 1015.

Fineness of single fiber: measured according to JIS L 1015.

Basis weight: nonwoven fabric cut to 50 cm square was weighed, and shown as a weight per unit area (g/m²).

Fiber finish content (%): fiber finish (finishing oil) applied to a dried fiber sample 2 g was extracted with methanol (25 mL) and after evaporating methanol, the weight of the residue is measured to calculate the oil content by weight (%).

Collecting efficiency (%): Using a particle measuring apparatus (manufactured by Rion Corp. particle counter, KC-01 (0.3 to 5 micrometers)), air dust (0.3 to 5 micrometers) was passed through a nonwoven fabric at a speed of 5 cm/min and the dust collected with the nonwoven fabric was weighed to calculate the amount of dust per total dust passed in percent (%).

Processability of nonwoven fabric: when the electro-chargeable fiber is formed into a web by an air-laid method and a carding method, the processability of nonwoven fabric was inspected by naked eyes in terms of formation of the resulting nonwoven fabric, openness of fibers, and dispersion of fibers, which was judged in the following order (on Table 3).

Excellent: ***

Standard: **

Inferior: *

The components and formulation of fiber finish used in Examples 1 to 7 and Comparative examples 1 to 3 are shown in Table 1. The production conditions of conjugate fibers applied with the fiber finish are shown in Table 2. Methods of applying fiber finish were a kiss roller method in a spinning process or a touch roller method in a stretching process, and a spraying method. A fiber having the number of crimps of 10 to 13/25 mm was used.

Examples 1 to 4 and 7, and Comparative Examples 1 to 3

Webs having a basis weight of 100 g/m² were produced by use of various fibers shown in Table 2, and the webs were passed through an air-through heat-treatment machine at 138° C. to obtain nonwoven fabrics. After being held under an atmosphere at 90° C. for 1 minute, the nonwoven fabric was electrically charged at 10 KV for 2 seconds to give an electret nonwoven fabric.

TABLE 1

| Fiber finish | Component | Weight ratio (Wt. %) | Ionicity |
|---|---|---|---|
| No. 1 | Polyoxyethylene sorbitan monostearate (EO = 20) | 100 | Nonionic |
| No. 2 | Polyoxyethylene lauryl ether (EO = 5) | 100 | Nonionic |
| No. 3 | Polyoxyethylene/ polyoxypropylene lauryl ether (EO = 2, PO = 6) | 100 | Nonionic |
| No. 4 | Polyoxyethylene sorbitan monooleate | 30 | Nonionic |
|  | Sorbitan monolaurate | 70 |  |
| No. 5 | Polyoxyethylene saturated alkyl ether | 65 | Cationic, Nonionic |
|  | Double salt of cationic type surfactant and anionic type surfactant | 30 |  |
|  | Silicone emulusifier | 5 |  |
| No. 6 | Sorbitan monolaurate | 20 | Cationic, Nonionic |
|  | Sorbitan monostearate | 60 |  |
|  | POE sorbitan monolaurate | 10 |  |
|  | Dioctyl sulfosuccinate | 10 |  |

Example 4

Using the electro-chargeable fiber made with a blend of modified PE in thermoplastic resin (HDPE) as sheath part shown by Example 4 in Table 2, a nonwoven fabric was produced under the same conditions of an air-laid method as in Example 1. The nonwoven fabric was electrically charged at 10 KV for 2 seconds after being held under an atmosphere at 90° C. for 1 minute to give an electret nonwoven fabric.

Example 5

As shown by Example 5 in Table 2, a tow was made of ethylene-propylene copolymer with a density of 0.922 g/cm³ (ethylene component of 3.5% by weight) as a thermoplastic resin of sheath part. The tow was cut to 51 mm, which was formed into a web having the target basis weight of 100 g/m² by a carding method, and a nonwoven fabric was produced by passing the web through an air-through heat-treatment machine at 138° C. The nonwoven fabric was electrically charged at 10 KV for 2 seconds after being held under an atmosphere at 90° C. for 1 minute to give an electret nonwoven fabric.

Example 6

Using a fiber (fiber length of 51 mm cut from a tow) shown by Example 6 in Table 2, a web having the target basis weight of 100 g/m² was formed by a carding method, from which nonwoven fabric was produced through a needlepunching machine. The nonwoven fabric was electrically charged at 10 KV for 2 seconds after being held under an atmosphere at 90° C. for 1 minute to give an electret nonwoven fabric.

Example 7

As shown by Example 7 in Table 2, nonwoven fabric was produced by the same thermoplastic resin and process conditions as those in Example 1 except that fiber finish 4 and a fiber with the fiber length of 3 mm were used. The nonwoven fabric was electrically charged at 10 KV for 2 seconds after being held under an atmosphere at 90° C. for 1 minute to give an electret nonwoven fabric.

TABLE 2

| Example & Comparative Example No. | Fiber Finish | Thermoplastic resin | | Sheath/Core ratio | Spinning temp. ° C. | Stretching temp. ° C. | Fineness dtex | Fiber length mm |
|---|---|---|---|---|---|---|---|---|
| | | Sheath part | Core part | | | | | |
| Example 1 | 1 | HDPE | PP | 50/50 | 250 | 80 | 1 | 5 |
| Example 2 | 2 | HDPE | PP | 50/50 | 250 | 90 | 2.2 | 5 |
| Example 3 | 3 | HDPE | PP | 50/50 | 250 | 80 | 2.2 | 5 |
| Example 4 | 4 | HDPE/Modified PE* | PP | 65/35 | 250 | 90 | 1.7 | 3 |
| Example 5 | 4 | Co-PP | PP | 40/60 | 250 | 90 | 2.2 | 51 |
| Example 6 | 4 | HDPE | PP | 50/50 | 250 | 80 | 2.2 | 51 |
| Example 7 | 4 | HDPE | PP | 50/50 | 250 | 80 | 1 | 3 |
| Comparative Example 1 | Non (Hot water washing) | HDPE | PP | 50/50 | 250 | 80 | 2.2 | 5 |
| Comparative Example 2 | 5 | HDPE | PP | 50/50 | 250 | 80 | 2.2 | 5 |
| Comparative Example 3 | 6 | HDPE | PP | 50/50 | 250 | 80 | 2.2 | 5 |

PP: Crystalline polypropylene (homopolymer)
HDPE: High-density polyethylene with a density of 0.960 g/cm³
Modified PE: High-density polyethylene of 0.960 g/cm³ as backbone polymer graft copolymerized with a mixture of anhydrous maleic acid and styrene (anhydrous acid content 0.33 mol/Kg, styrene content 0.30 mol/Kg)
co-PP: Ethylene-propylene copolymer with a density of 0.922 g/cm³ (ethylene component 3.5 wt. %)
*mark Mixed ratio of modified PE was 7.5 wt. % of total weight of thermoplastic resin as sheath part

Comparative Example 1

A nonwoven fabric produced in the same conditions as in Example 1 was washed with hot water to remove fiber finish, and the nonwoven fabric was electret-processed.

Comparative Examples 2 and 3

A nonwoven fabric was produced in the same conditions as in Example 1 except that a cationic component was added to sorbitan fatty acid esters or polyoxyethylene alkyl ether used as fiber finish.

Collecting efficiency was measured for the electret nonwoven fabrics of Examples 1 to 7 and Comparative examples 1 to 3. The results of collecting efficiency and amount of oil applied were shown in Table 3. Collecting efficiency is a rate of collecting air dust passing through a nonwoven fabric, and can be thought to be a rate of collecting dust due to an electrostatic effect. Therefore, collecting efficiency was used as an indicator of the electrostatic property of nonwoven fabric. A fiber having a high collecting efficiency shows an excellent electrostatic property.

TABLE 3

| Example & Comparative Example No. | Fiber Finish | Fineness (dtex) | Basis weight (g/m²) | Amount of applied fiber finish (%) | Collecting efficiency (%) | Processability |
|---|---|---|---|---|---|---|
| Example 1 | 1 | 1.0 | 119 | 0.88 | 61.8 | ** |
| Example 2 | 2 | 2.2 | 118 | 0.62 | 48.3 | ** |
| Example 3 | 3 | 2.2 | 125 | 0.31 | 49.6 | ** |
| Example 4 | 4 | 1.7 | 84 | 0.30 | 50.1 | *** |
| Example 5 | 4 | 2.2 | 100 | 0.42 | 60.0 | *** |
| Example 6 | 4 | 2.2 | 100 | 0.30 | 45.3 | *** |
| Example 7 | 4 | 1.0 | 104 | 0.31 | 21.7 | *** |
| Comparative Example 1 | | 2.2 | 110 | 0 | 56.0 | *** |
| Comparative Example 2 | 5 | 2.2 | 115 | 0.25 | 8.7 | *** |
| Comparative Example 3 | 6 | 2.2 | 109 | 0.52 | 9.3 | *** |

The electro-chargeable fiber of the present invention does not need washing of fiber finish, which was demonstrated by the results that the collecting efficiency of those in Examples 1 to 6 was the same as that of Comparative example 1 obtained by a conventional washing treatment. It was shown that in an electret processing, an excellent electrostatic property was obtained without a necessary heat history during a nonwoven fabric processing and/or after being processed. This means that by using the electro-chargeable fiber of the present invention, various suitable nonwoven fabric processings such as a needlepunching method and an air-through method can be applied via no multi-treatment process. As for the fiber finish containing ionic character in Comparative examples 2 and 3, it gave practically no electrostatic property by an electret processing. This suggests that a quantity of electricity charged in the fiber is discharged via an ionic component existing in fiber finish. Examples 4 and 5 using the same fiber finish as Example 7 showed a very excellent electrostatic property (collecting efficiency). This may result from a difference of thermoplastic resins composing the fiber, which indicates that the effect of the present invention can be enhanced by a selection of thermoplastic resins. Namely, electrostatic retention after electrical charge by an electret processing depends greatly on a thermoplastic resin, so that use of the thermoplastic resin comprising a modifying agent is one of preferred embodiments.

In addition, since fiber finish 4 gave an excellent electrostatic property by an electret processing and processability of nonwoven fabric as well, the fiber finish is thought to have a component ratio of fiber finish in a preferable range.

The electro-chargeable fiber of the present invention can be efficiently processed in a nonwoven fabric processing with an air-laid machine and a carding machine by suppressing generation of electrostatic, electrically charged sufficiently in an electret treatment via no process of washing of fiber finish, thus can be used for nonwoven products being required collecting effect such as an air filter and a wipe.

While a detailed description of the present invention has been provided above, the present invention is not limited to the detailed description and modifications will be apparent. The invention is defined by the claims that follow.

What is claimed is:

1. A final product made of a nonwoven fabric comprising an electro-chargeable fiber comprising a thermoplastic resin fiber having a nonionic fiber finish containing at least one of (a) 50% or more, by weight of the fiber finish, of a sorbitan fatty acid ester having formula (I) or formula (II), and (b) 50% or more, by weight of the fiber finish, of a polyoxyalkylene alkyl ether having formula (III), wherein the nonionic fiber finish is present in an amount of 0.01-1.5% by weight of the thermoplastic resin fiber and the nonwoven fabric being made by an air-laid process;

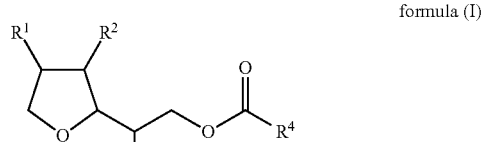

formula (I)

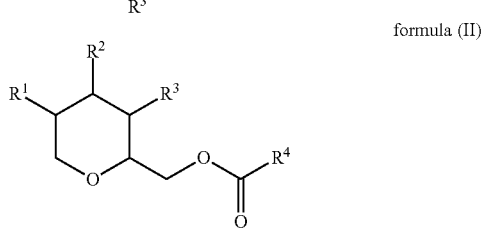

formula (II)

wherein $R^1$, $R^2$, and $R^3$ independently of one another represent a hydroxyl group, a polyoxyethylene group, or a polyoxypropylene group, the respective degree of polymerization, with an ethylene oxide group or a propylene oxide group considered as a constitutional unit, independently of one another is from 0 to 55, and $R^4$ represents a saturated or unsaturated aliphatic hydrocarbon group of 16-30 carbon atoms,

 formula (III)

wherein $R^5$ represents a saturated or unsaturated aliphatic hydrocarbon group of 12-30 carbon atoms, $R^6$ represents hydrogen or a methyl group, and k is an integer from 5 to 50, the nonwoven fabric is made by the air-laid process, the nonwoven fabric having intersections of heat-adhered fibers or mechanically interlaced fibers, and is charged by electret-treatment, the electret-treatment is a heat electret treatment or a corona discharge treatment, where the electro-chargeable fiber has a fiber length of 3 to 40 mm.

2. The final product of claim 1 wherein the thermoplastic resin fiber is a conjugate fiber comprising at least two types of thermoplastic resins having different melting points from each other, wherein at least one type of the thermoplastic resins is a polyolefin, and the polyolefin is exposed on at least one part of the conjugate fiber surface continuously in a length direction.

3. The final product of claim 1, wherein the thermoplastic resin fiber is composed of thermoplastic resins, wherein at least one sort of the thermoplastic resins comprises a polymer of vinyl monomer having a functional group.

4. The final product according to claim 1, wherein the electro-chargeable fiber is mixed with at least one type selected from the group consisting of another fiber, another non-woven fabric, a film, a pulp sheet, a knit and a textile fabric.

5. The final product of claim 1, wherein the nonwoven fabric is a composite nonwoven fabric made by multilayering with at least one type selected from the group consisting of another fiber, another non-woven fabric, a film, a pulp sheet, a knit and a textile fabric.

6. The final product of claim 1, which is in the form of one selected from the group consisting of an air filter, a wipe and a mask.

7. The final product of claim 4, which is in the form of one selected from the group consisting of an air filter, a wipe and a mask.

8. The final product of claim 5, which is in the form of one selected from the group consisting of an air filter, a wipe and a mask.

9. A nonwoven fabric made by an air-laid method or carding method with an electro-chargeable fiber and a second fiber that is a cellulosic fiber, wherein the electro-chargeable fiber comprises a thermoplastic resin fiber, wherein the thermoplastic fiber comprises at least one polymer of vinyl monomer having a functional group, and the thermoplastic resin fiber has a nonionic fiber finish containing at least one of (a) 50% or more, by weight of the fiber finish, of a sorbitan fatty acid ester having formula (I) or formula (II), and (b) 50% or more, by weight of the fiber finish, of a polyoxyalkylene alkyl ether having formula (III), wherein the nonionic fiber finish is present in an amount of 0.01-1.5% by weight of the thermoplastic resin fiber;

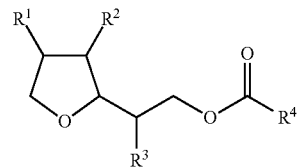 formula (I)

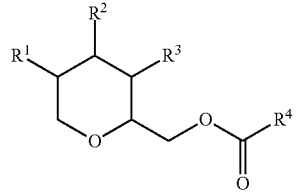 formula (II)

wherein $R^1$, $R^2$, and $R^3$ independently of one another represent a hydroxyl group, a polyoxyethylene group, or a polyoxypropylene group, the respective degree of polymerization, with an ethylene oxide group or a propylene oxide group considered as a constitutional unit, independently of one another is from 0 to 55, and $R^4$ represents a saturated or unsaturated aliphatic hydrocarbon group of 16-30 carbon atoms,

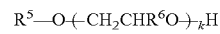 formula (III)

wherein $R^5$ represents a saturated or unsaturated aliphatic hydrocarbon group of 12-30 carbon atoms, $R^6$ represents hydrogen or a methyl group, and k is an integer from 5 to 50, and wherein the nonwoven fabric having intersections of heat-adhered fibers or mechanically interlaced fibers, and is charged by electret-treatment, the electret-treatment is a heat electret treatment or a corona discharge treatment.

10. A method of making a nonwoven fabric, comprising:

forming by an air-laid or carding process a web that comprises an electro-chargeable fiber comprising a thermoplastic resin fiber having a nonionic fiber finish containing at least one of (a) 50% or more, by weight of the fiber finish, of a sorbitan fatty acid ester having formula (I) or formula (II), and (b) 50% or more, by weight of the fiber finish, of a polyoxyalkylene alkyl ether having formula (III), wherein the nonionic fiber finish is present in an amount of 0.01-1.5% by weight of the thermoplastic resin fiber;

processing the web into a nonwoven fabric by a heat treatment to heat-adhere fiber intersections or by mechanically interlacing fibers; and charging the nonwoven fabric by an electret-treatment, the electret-treatment is a heat electret treatment or a corona discharge treatment;

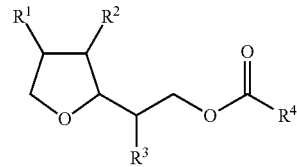 formula (I)

-continued

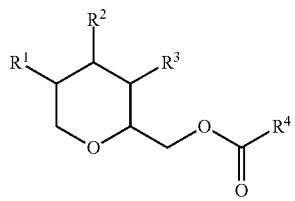
formula (II)

wherein $R^1$, $R^2$, and $R^3$ independently of one another represent a hydroxyl group, a polyoxyethylene group, or a polyoxypropylene group, the respective degree of polymerization, with an ethylene oxide group or a propylene oxide group considered as a constitutional unit, independently of one another is from 0 to 55, and $R^4$ represents a saturated or unsaturated aliphatic hydrocarbon group of 16-30 carbon atoms,

formula (III)

wherein $R^5$ represents a saturated or unsaturated aliphatic hydrocarbon group of 12-30 carbon atoms, $R^6$ represents hydrogen or a methyl group, and k is an integer from 5 to 50.

11. A nonwoven fabric made by an air-laid method with a first fiber and a second fiber that is a cellulosic fiber, wherein the first fiber comprises an electro-chargeable fiber comprising a thermoplastic resin fiber, wherein the thermoplastic fiber comprises at least one polymer of vinyl monomer having a functional group, and the thermoplastic resin fiber has a nonionic fiber finish containing at least one of (a) 50% or more, by weight of the fiber finish, of a sorbitan fatty acid ester having formula (I) or formula (II), and (b) 50% or more, by weight of the fiber finish, of a polyoxyalkylene alkyl ether having formula (III), wherein the nonionic fiber finish is present in an amount of 0.01-1.5% by weight of the thermoplastic resin fiber;

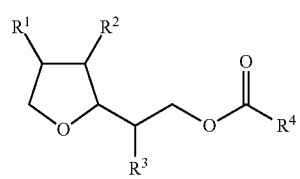
formula (I)

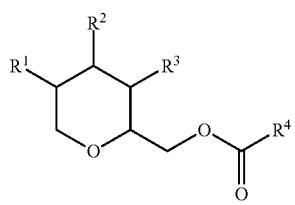
formula (II)

wherein $R^1$, $R^2$, and $R^3$ independently of one another represent a hydroxyl group, a polyoxyethylene group, or a polyoxypropylene group, the respective degree of polymerization, with an ethylene oxide group or a propylene oxide group considered as a constitutional unit, independently of one another is from 0 to 55, and $R^4$ represents a saturated or unsaturated aliphatic hydrocarbon group of 16-30 carbon atoms,

formula (III)

wherein $R^5$ represents a saturated or unsaturated aliphatic hydrocarbon group of 12-30 carbon atoms, $R^6$ represents hydrogen or a methyl group, and k is an integer from 5 to 50, and wherein the nonwoven fabric having intersections of heat-adhered fibers or mechanically interlaced fibers, and is charged by electret-treatment, the electret-treatment is a heat electret treatment or a corona discharge treatment.

12. A final product made of a nonwoven fabric comprising an electro-chargeable fiber comprising a thermoplastic resin fiber having a nonionic fiber finish containing at least one of (a) 50% or more, by weight of the fiber finish, of a sorbitan fatty acid ester having formula (I) or formula (II), and (b) 50% or more, by weight of the fiber finish, of a polyoxyalkylene alkyl ether having formula (III), wherein the nonionic fiber finish is present in an amount of 0.01-1.5% by weight of the thermoplastic resin fiber and the nonwoven fabric being made by a carding process;

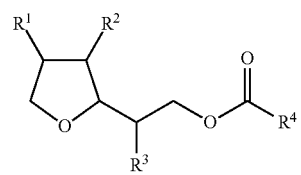
formula (I)

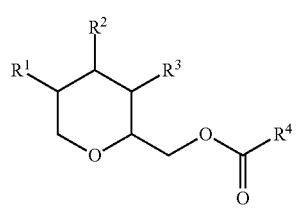
formula (II)

wherein $R^1$, $R^2$, and $R^3$ independently of one another represent a hydroxyl group, a polyoxyethylene group, or a polyoxypropylene group, the respective degree of polymerization, with an ethylene oxide group or a propylene oxide group considered as a constitutional unit, independently of one another is from 0 to 55, and $R^4$ represents a saturated or unsaturated aliphatic hydrocarbon group of 16-30 carbon atoms,

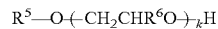
formula (III)

wherein $R^5$ represents a saturated or unsaturated aliphatic hydrocarbon group of 12-30 carbon atoms, $R^6$ represents hydrogen or a methyl group, and k is an integer from 5 to 50, and the nonwoven fabric having intersections of heat-adhered fibers or mechanically interlaced fibers, and is charged by electret-treatment, the electret-treatment is a heat electret treatment or a corona discharge treatment, and is made by the carding process with electro-chargeable fiber having a fiber length of 32 to 120 mm.

13. The final product of claim 12 wherein the thermoplastic resin fiber is a conjugate fiber comprising at least two types of thermoplastic resins having different melting points from each other, wherein at least one type of the thermoplastic resins is a polyolefin, and the polyolefin is exposed on at least one part of the conjugate fiber surface continuously in a length direction.

14. The final product of claim 12, wherein the thermoplastic resin fiber is composed of thermoplastic resins, wherein at least one sort of the thermoplastic resins comprises a polymer of vinyl monomer having a functional group.

15. The final product of claim 12, which is in the form of one selected from the group consisting of an air filter, a wipe and a mask.

16. The final product according to claim 12, wherein the electro-chargeable fiber is mixed with at least one type selected from the group consisting of another fiber, another non-woven fabric, a film, a pulp sheet, a knit and a textile fabric.

17. The final product of claim 16, which is in the form of one selected from the group consisting of an air filter, a wipe and a mask.

18. The final product of claim 12, wherein the nonwoven fabric is a composite nonwoven fabric made by multilayering with at least one type selected from the group consisting of another fiber, another non-woven fabric, a film, a pulp sheet, a knit and a textile fabric.

19. The final product of claim 18, which is in the form of one selected from the group consisting of an air filter, a wipe and a mask.

* * * * *